United States Patent
Bower, III et al.

(10) Patent No.: US 10,243,806 B2
(45) Date of Patent: Mar. 26, 2019

(54) SPATIAL ORDERING DETERMINATION OF DEVICES USING SET-WISE ANALYSIS OF RADIO DEVICE PROXIMITY SET COMPARISONS

(71) Applicant: Lenovo Enterprise Solutions (Singapore) Pte. Ltd., Singapore (SG)

(72) Inventors: Fred Allison Bower, III, Durham, NC (US); Charles Christian Queen, Apex, NC (US); David Martin Roth, Raleigh, NC (US); Patricia May Genovese, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 148 days.

(21) Appl. No.: 15/135,470

(22) Filed: Apr. 21, 2016

(65) Prior Publication Data

US 2017/0310555 A1    Oct. 26, 2017

(51) Int. Cl.
*H04L 12/24* (2006.01)
*H04L 12/26* (2006.01)
*H04B 5/00* (2006.01)
*H04W 4/80* (2018.01)

(52) U.S. Cl.
CPC ......... *H04L 41/142* (2013.01); *H04B 5/0031* (2013.01); *H04L 43/045* (2013.01); *H04W 4/80* (2018.02)

(58) Field of Classification Search
CPC ... H04B 5/0031; H04L 41/142; H04L 43/045; H04W 4/008
See application file for complete search history.

(56) References Cited

U.S. PATENT DOCUMENTS

| | | | |
|---|---|---|---|
| 9,591,606 B1* | 3/2017 | Shetty | H04W 64/00 |
| 2009/0072967 A1* | 3/2009 | Campbell | G01S 13/876 340/539.13 |
| 2015/0102101 A1* | 4/2015 | Hazzard | H05K 7/1498 235/375 |
| 2016/0099832 A1* | 4/2016 | Alshinnawi | H04L 41/082 709/221 |

OTHER PUBLICATIONS

"About the Technology," NFC Forum, Dec. 2015, pp. 1-2, retrieved from https://web.archive.org/web/20160318065625/http://nfc-forum.org/what-is-nfc/about-the-technology/.

(Continued)

*Primary Examiner* — Gil H. Lee
(74) *Attorney, Agent, or Firm* — Zilka-Kotab, P.C.

(57) ABSTRACT

In one embodiment, a method includes: receiving radio proximity information from a plurality of radio devices arranged along a rack, performing set-wise analysis of the radio proximity information for determining a spatial ordering of the radio devices and/or hardware elements associated with the radio devices, and storing the spatial ordering in memory. In another embodiment, a computer program product includes: a computer readable storage medium having program code stored thereon. The program code is executable by a computer to cause the computer to perform the foregoing method. In yet another embodiment, a system includes: a processing circuit having logic stored thereon and/or in memory. The logic is configured to perform the foregoing method.

18 Claims, 5 Drawing Sheets

(56) References Cited

OTHER PUBLICATIONS

"Stowers Institute Unveils Item-Level Tagging for Medical Showroom," Nov. 13, 2002, pp. 1-2, retrieved from www.rfid24-7.com/article/stowers-institute-unveils-item-level-tagging-for-medical-showroom/.

"NTAIL Demonstrators," Apr. 9, 2016, pp. 1-4, https://web.archive.org/web/20160409125513/http://it-futures.com/ntails/index.php/demo-sets.

Lynch, K., "IT Asset Tracking with RFID is not Rocket Science," Nov. 24, 2010, pp. 1-14, retrieved from http://rfid.thingmagic.com/rfid-blog/bid/51427/IT-Asset-Tracking-with-RFID-is-not-Rocket-Science.

"RFID in High Tech," Conference Agenda for Oct. 2-3, 2013, Jun. 10, 2015, pp. 1-4, retrieved from https://web.archive.org/web/20150610003209/http://www.rfidjournalevents.com/hightech/agenda.php.

Hazas, M. et al., "A Relative Positioning System for Co-located Mobile Devices," 2002, pp. 1-15, retrieved from http://usenix.org/legacy/publications/library/proceedings/mobisys05/tech/full_papers/hazas/hazas_html/MobiSys2005.html.

Zhao, Y. et al., "VIRE: Active RFID-based Localization Using Virtual Reference Elimination," 2007 International Conference on Parallel Processing, 2007, pp. 1-8.

\* cited by examiner

SPATIAL ORDERING DETERMINATION OF DEVICES USING SET-WISE ANALYSIS OF RADIO DEVICE PROXIMITY SET COMPARISONS

The present invention relates to determining spatial ordering of devices, and more particularly, this invention relates to the determination of the spatial ordering of devices using set-wise analysis of radio device proximity set comparisons.

BACKGROUND

As devices are added to and removed from a server rack, for example, determining where a device is installed within the rack without aid of instrumentation in the rack itself or manual input of placement data may become a difficult task.

Cabling of the storage rack has been considered for performing such a task, where the cabling may allow the administrator to infer position of devices from switch port assignments. In this consideration, the rack network cables may be routed at the time the rack is assembled and equipment placed into it. Then, based upon which port the discovered device is connected to on the top-of-rack switch, the administrator may assign a rack location. The cabling method has drawbacks and may therefore be an insufficient method of determining where a device is installed within a rack. One drawback is that changes to the installed components may result in a change in cabling throughout various parts of the device rack, requiring a change to the assignment schema, which is a manual process.

Another drawback of this method may be that administrators may need access to network switch port information in order to establish rack location. However, this information may be sensitive and/or not generally available to the system administrator.

Yet another drawback of this method is that the schema may be subject to errors in cabling within the rack or plugging of cables at the top-of-rack switch interface.

Instrumenting racks themselves with active or passive assistance to communicate position information to the installed devices has also been considered in an attempt to determine where a device is installed within the rack without manual input of placement data. Instrumenting racks in such a way has proved to be unsuccessful, as installed devices are often incompatible with the attempted solution, and additional hardware for interfacing with the rack is costly.

In yet another considered solution, rack location information is manually established via either a bulk import of data provided by the administrator and/or rack builder. Rack location information has also been manually established via inputting information, e.g., scanning barcodes, scanning QR codes, scanning RFID tags, etc., from the rack into an application on the installed hardware and then correlating such information with rack positions. These approaches have proven unsuccessful and/or undesirable, as such reconfigurations are frequently not detected without manual means and erroneous inputs are often not detectable.

SUMMARY

In one embodiment, a method includes: receiving radio proximity information from a plurality of radio devices arranged along a rack, performing set-wise analysis of the radio proximity information for determining a spatial ordering of the radio devices and/or hardware elements associated with the radio devices, and storing the spatial ordering in memory.

In another embodiment, a computer program product includes: a computer readable storage medium having program code stored thereon. The program code is executable by a computer to cause the computer to perform the foregoing method.

In yet another embodiment, a system includes: a processing circuit having logic stored thereon and/or in memory. The logic is configured to perform the foregoing method.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
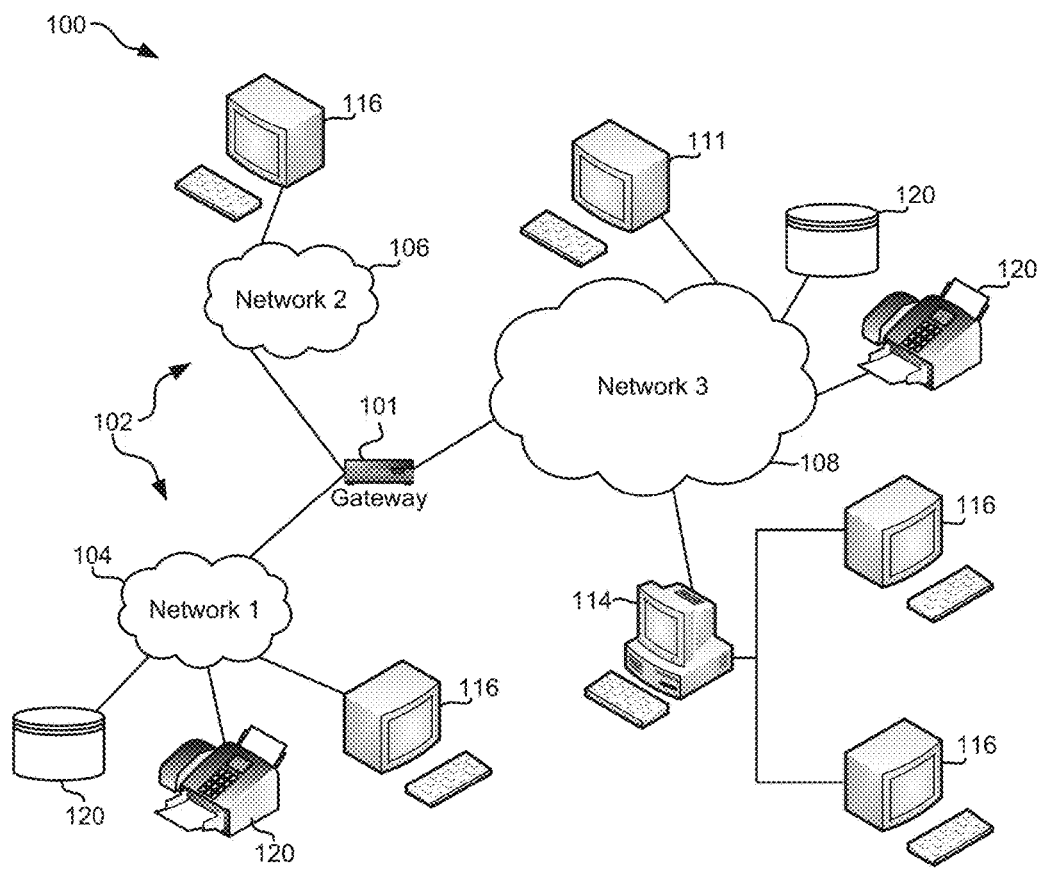
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems and methods for determining the spatial ordering of devices using set-wise analysis of radio device proximity set comparisons.

In one general embodiment, a method includes: receiving radio proximity information from a plurality of radio devices arranged along a rack, performing set-wise analysis of the radio proximity information for determining a spatial ordering of the radio devices and/or hardware elements associated with the radio devices, and storing the spatial ordering in memory.

In another general embodiment, a computer program product includes: a computer readable storage medium having program code stored thereon. The program code is executable by a computer to cause the computer to perform the foregoing method.

In yet another general embodiment, a system includes: a processing circuit having logic stored thereon and/or in memory. The logic is configured to perform the foregoing method.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

Embodiments of the present invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
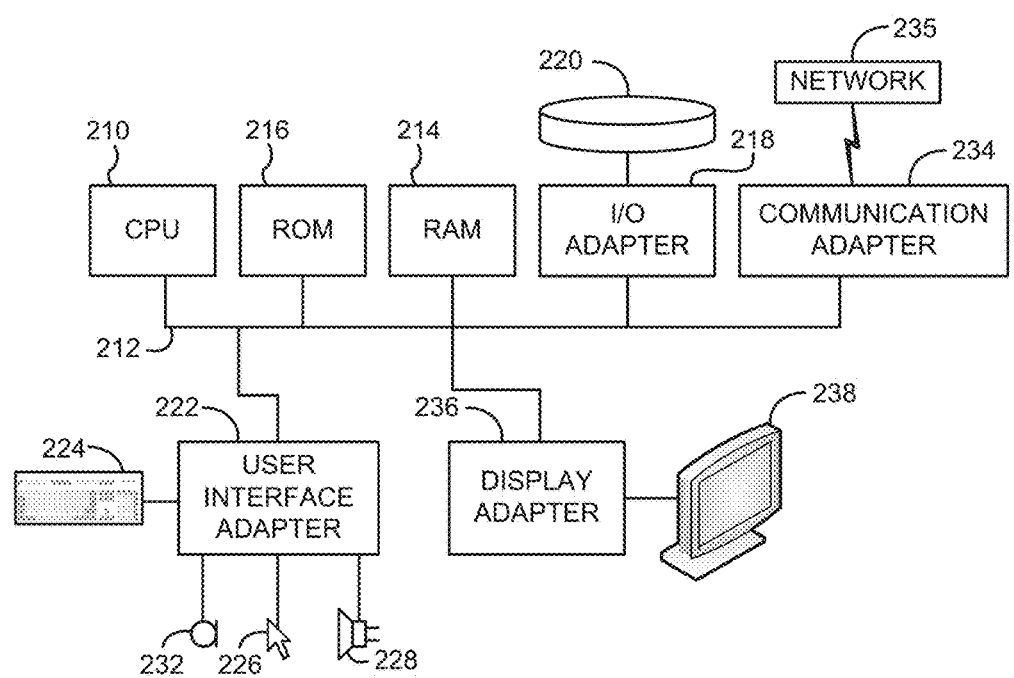
FIG. 2 shows a representative hardware environment that may be associated with the servers and/or clients of FIG. 1.

FIG. 2 shows a representative hardware environment associated with a user device 116 and/or server 114 of FIG.

1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

As devices are installed and/or removed from a server rack without aid of instrumentation in the rack itself or manual input of placement data, location information and/or configuration information of each device may be unknown. Not knowing the location of one or more devices may limit the performance of the system that includes the server rack and/or cause errors.

Various embodiments described herein include the use of low-power wireless radios to wirelessly establish neighbor relationships between hardware components installed in the server rack. From the set of neighbor relationships, set-wise analysis may be used to establish the relative position of the devices with respect to one another. The proliferation of the use of near-field communications (NFC) in present and/or next-generation information technology (IT) infrastructure may enable these embodiments.

Figure 3A:
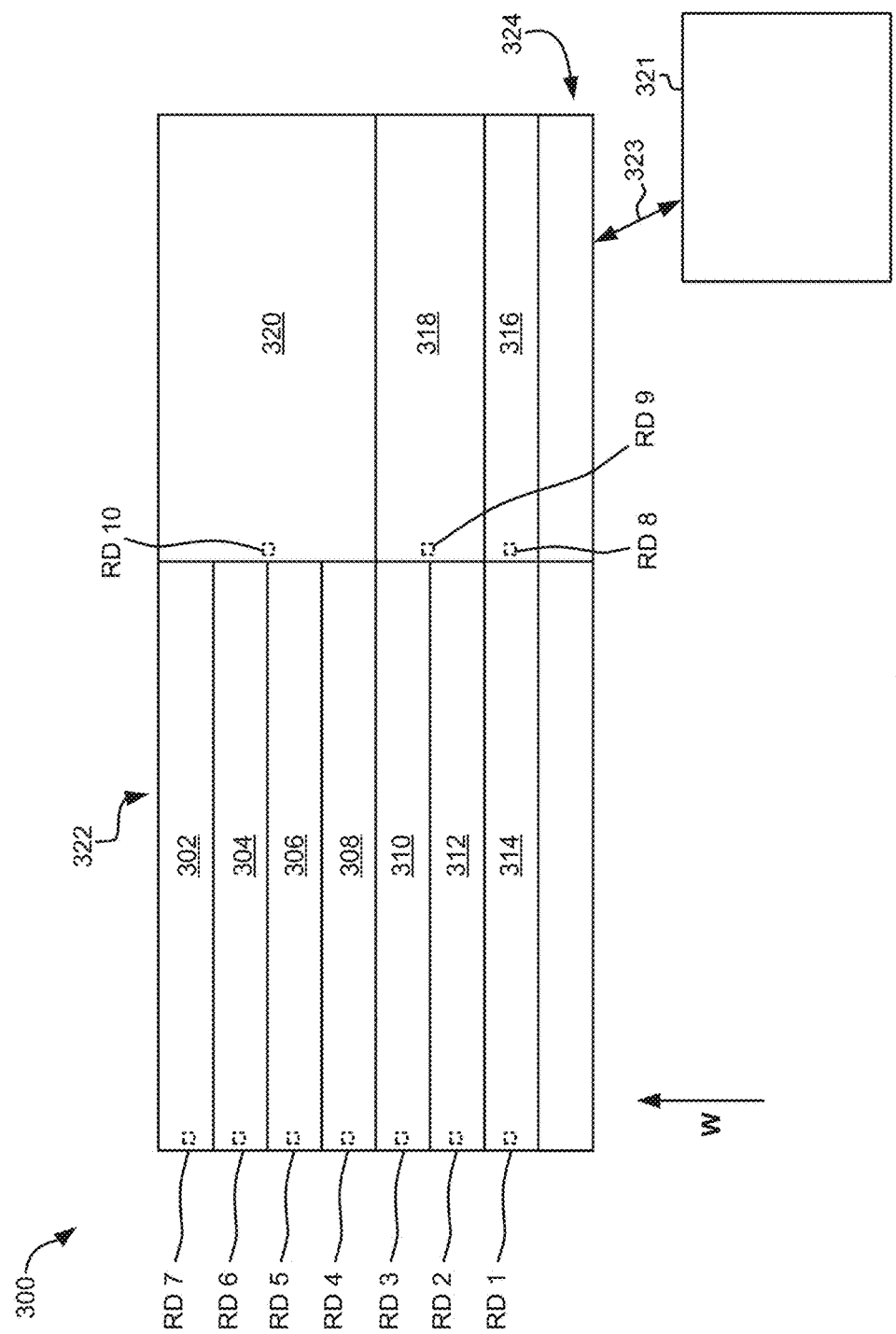
FIG. 3A is a representational side view of a system, in accordance with one embodiment.
Figure 3B:
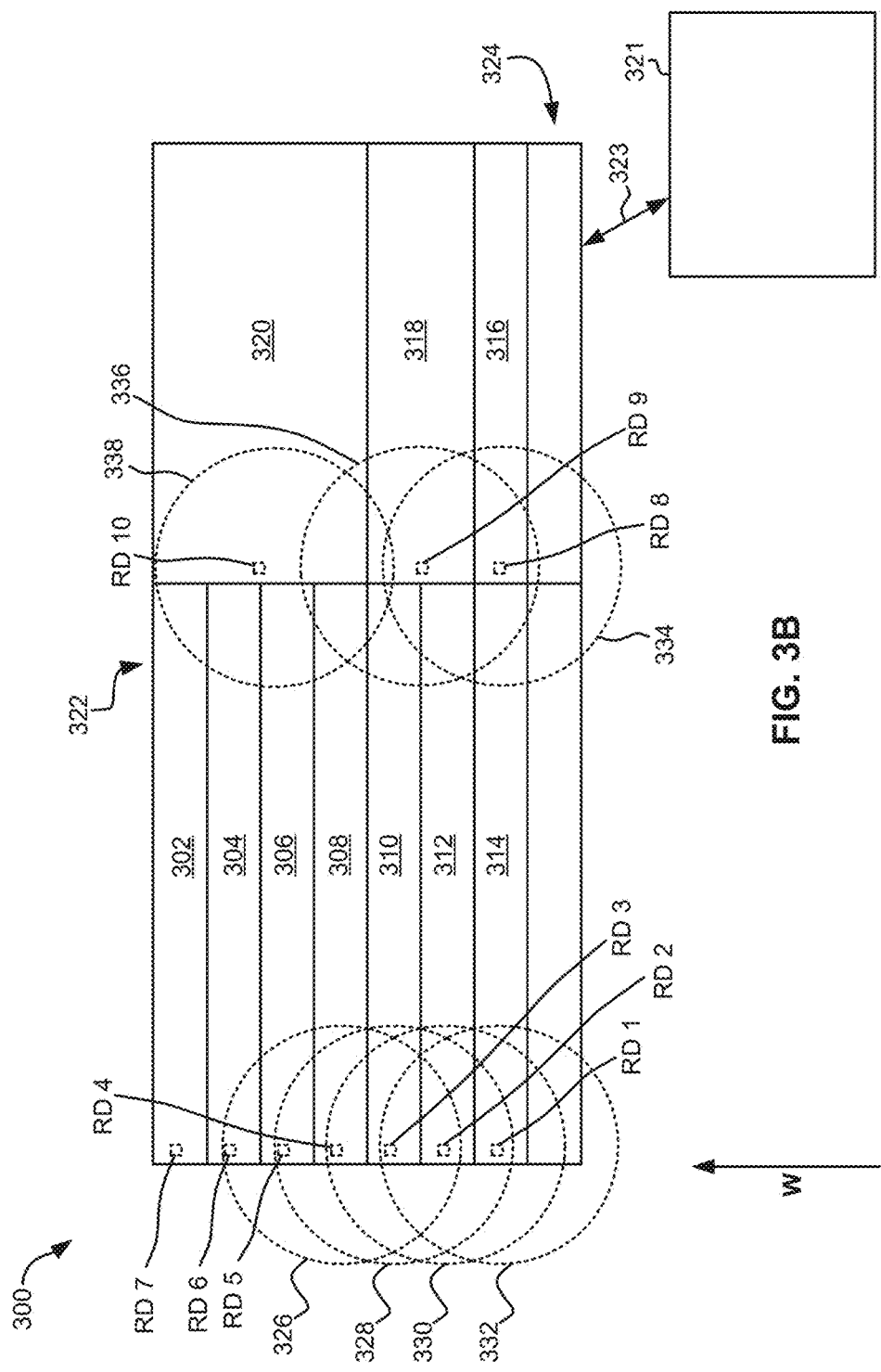
FIG. 3B is a representational side view of the system of FIG. 3A, in accordance with one embodiment.

Referring now to FIGS. 3A-3B, system 300 will now be described to provide a contextual example of a rack 322 and hardware elements with low-power wireless radio devices coupled thereto.

FIGS. 3A-3B depict a system 300, in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

According to one embodiment, system 300 may be a server system. According to another embodiment, system 300 may be any type of data center system. According to yet another embodiment, system 300 may be a workstation system. According to yet another embodiment, system 300 may be based on a known system type that would be appreciated by one skilled in the art upon reading the present description.

System 300 includes a rack 322. The rack 322 may include any type and/or configuration of hardware elements.

For example, the rack 322 and/or other racks (not shown) of system 300 may include, e.g., servers, fans, memory (data storage) modules, networking equipment, etc. Configurations and/or types of hardware elements in storage racks of system 300 may vary depending on the embodiment.

Hardware elements may be installed in the rack 322. According to one approach, the hardware elements may be press fit coupled to a connector (not shown) in the rack 322. According to another approach the hardware elements may be installed in the rack 322 with signal cables.

According to the illustrative embodiment shown in FIG. 3A, the rack 322 includes 1U hardware elements 302, 304, 306, 308, 310, 312, 314, 316 (respectively). The rack 322 also includes a 2U hardware element 318. The rack 322 also includes a 4U hardware element 320.

The rack 322 may also include one or more unused areas 324, which may, but in the present example do not, include hardware elements.

Any of the spatial dimensions of the components of system 300 may vary depending on the embodiment. For purposes of an example, the rack 322 of the present embodiment may have a width of 19 inches in a direction W. The 1U hardware elements 302-316 may each have a height of 1U (1.75 inches) in a direction W. The 2U hardware element 318 may have a height of 2U (3.5 inches) in a direction W, and the 4U hardware element 320 may have a height of 4U (7 inches) in a direction W.

An actively powered radio device, e.g., an NFC radio, may be coupled to each of the hardware elements 302, 304, 306, 308, 310, 312, 314, 316, 318, 320. The 1U hardware elements 302, 304, 306, 308, 310, 312, 314, 316 include radio devices RD 7, 6, 5, 4, 3, 2, 1, 8, respectively (labeled "RD" # in FIGS. 3A-3B). The 2U hardware element 318 includes radio device RD 9. The 4U hardware element 320 includes radio device RD 10.

According to one embodiment, some or all of the radio devices RD 1-10 may be integrated in their respective hardware elements 302-320 during assembly of the hardware elements 302-320.

According to another embodiment, some or all of the radio devices RD 1-10 may be coupled to their respective hardware elements 302-320 as an aftermarket add-on. The coupling between each radio device RD 1-10 and its respective hardware element 302-320 may be established, e.g., via an adhesive, via a screw, via a coupling means of a type known in the art, etc.

Each of the radio devices RD 1-10 may have a pre-association with their respective hardware elements 302-320 that enables identification of the hardware via the radio device coupled thereto. In response to any of the radio devices not having a pre-association with their respective hardware element, an installer may establish such an association.

System 300 may also include a management server 321. The management server may include, e.g., a fan, a controller, a wireless and/or hardwire connection port, etc.

The management server 321 may also include a processing circuit. The processing circuit may preferably have logic stored thereon and/or in memory, where the logic may be configured to determine a spatial ordering of the radio devices RD 1-10 and/or hardware elements 302-320 associated with the radio devices RD 1-10, as will be described elsewhere herein (see method 400).

The radio devices RD 1-10 may be in communication with the management server 321 and/or some other processing circuit, e.g., one in located in the rack 322, at a remote host, etc.

According to one embodiment, some or all of the radio devices RD 1-10 may perform communication(s) with the processing circuit and/or the management server 321 wirelessly. According to another embodiment, some or all of the radio devices RD 1-10 may perform communication(s) with the processing circuit and/or the management server 321 via a hardwired connection 323 that originates at each of the hardware element 302-320 and/or radio devices RD 1-10 in the rack 322.

An illustrative example of using the radio devices RD 1-10 to determine the spatial ordering of one or more of the hardware elements 302-320 of the rack 322 will now be described below.

To establish the relative position of one or more of the hardware elements 302-320 of the rack 322, one or more of the radio devices RD 1-10 may exchange basic information about the system 300 with different radio devices RD 1-10 in the rack 322.

According to one embodiment, the radio devices RD 1-10 may exchange basic information about the system 300 by one or more of the radio devices RD 1-10 broadcasting in a discoverable bandwidth.

Each broadcasted bandwidth may extend to a known range, herein referred to as a radio device "operational communication range". The operational communication range of each hardware element's radio device may be scaled to extend to a predefined number of neighboring hardware element radio devices. Operational communication ranges may typically extend to between 0 and 3 neighboring hardware elements; however, the operational communication range may vary, e.g., depending on the spatial parameters of the rack 322, depending on the configuration of and/or size(s) of the hardware elements 302-320, depending on variables that would be appreciated by one skilled in the art upon reading the present description, etc.

For example, the operational communication range of each hardware element's radio device RD 1-10 may not extend to a number of neighboring hardware element radio devices RD 1-10 that would prevent a set-wise analysis of the radio proximity information for determining a spatial ordering of the radio devices (see method 400) and/or that would weaken the sampling fidelity.

Referring now to FIG. 3B, an illustrative example of a portion of the radio devices RD 1-10 establishing communication with and/or exchanging basic information with other radio devices in operational communication range will now be described in detail below.

In FIG. 3B the radio devices RD 1, 2, 3, 4 associated with the hardware elements 314, 312, 310, 308 include operational communication ranges 332, 330, 328, 326 (respectively). Furthermore, the radio devices RD 8, 9, 10 associated with the hardware elements 316, 318, 320 include operational communication ranges 334, 336, 338 (respectively).

In FIG. 3B, the operational communication ranges 332, 330, 328, 326, 334, 336, 338 of the radio devices RD 1, 2, 3, 4, 8, 9, 10 may extends radially about four inches from the location of each radio device. This may equate to a 1U hardware element radio device having a discovery range of two neighboring 1U hardware element's radio devices in a direction W and two neighboring 1U hardware element's radio devices in a direction opposite direction W. For example, RD 3 is able to detect RD 1, 2, 4 and 5. More examples are provided below.

It should be noted that the about four inch operational communication ranges of radio devices RD 1-10 may be correlated to the dimensional layout of rack 322, but should not be interpretively limited thereto.

For example, the operational communication ranges 332, 330, 328, 326, 334, 336, 338 may be increased or decreased in different racks and/or in rack 322 in response to more than one of the radio devices RD 1-10 not discovering a different radio device RD 1-10 during attempted communication.

The discovery of the radio devices RD 1-4 will now be described below for illustrative purposes.

Radio device RD 1 of hardware element 314, which has the operational communication range 332, may discover, e.g., via exchanging basic information about the system 300 with neighboring radio devices in the operational communication range 332, radio devices RD 2-3 which are associated with hardware elements 312, 310. Radio devices RD 2-3 of hardware elements 312, 310 are discovered to be positioned in the operational communication range 332 of radio device RD 1, while other radio devices RD 4-10 are not discovered, as they are not located in the operational communication range 332.

Radio device RD 2 which is associated with hardware element 312, and has the operational communication range 330, may discover radio devices RD 1, 3, 4 which are associated with hardware elements 314, 310, 308. Radio device RD 3 which is associated with hardware element 310, and has the operational communication range 328, may discover radio devices RD 1, 2, 4, 5. Radio device RD 4 which is associated with hardware element 308, and has the operational communication range 326, may discover radio devices RD 2, 3, 5, 6.

The discoveries of radio devices RD 1-4 which are associated with hardware elements 314, 312, 310, 308 may be more clearly represented in Table 1 below, where the radio device numbers are in brackets.

TABLE 1

Hardware Element 314 discovery = {2, 3};
Hardware Element 312 discovery = {1, 3, 4};
Hardware Element 310 discovery = {1, 2, 4, 5};
Hardware Element 308 discovery = {2, 3, 5, 6}.

The discovery of the radio devices RD 8-10 will now be detailed below for another illustrative example below.

Radio device RD 8 which is associated with hardware element 316, and has the operational communication range 334, may discover radio device RD 9. Radio device RD 9 is discovered to be located in the operational communication range 334 of radio device RD 8, while radio devices RD 1-7, 10 are not discovered, as they are not located in the operational communication range 334. Radio device RD 9 which is associated with hardware element 318, and has the operational communication range 336, may discover radio device RD 8. Radio device RD 10 which is associated with hardware element 320, and has the operational communication range 338, may discover no radio devices, as the operational communication range 338 does not extend to any radio devices in the rack 322.

The discovery of radio devices RD 8-10 which are associated with hardware elements 316, 318, 320 may be more clearly represented in Table 2 below.

TABLE 2

Hardware Element 316 discovery = {9};
Hardware Element 318 discovery = {8};
Hardware Element 320 discovery = {none}.

It should be noted that the operational communication ranges and exchange of basic information between radio devices RD 1-7 and 8-10 are described above and herein as separate examples to provide illustrative descriptions of relational device position determinations between both similar hardware element types/sizes, e.g., 1U hardware elements 302-314 in table 1, and varying hardware element types/sizes, e.g., 1U, 2U and 4U hardware elements 316, 318, 320 in Table 2.

The radio proximity information, e.g., the discovery information of Tables 1-2, of the plurality of radio devices RD 1-10 may be stored locally on each hardware element 304, 306, 308, 310, 312, 314, 316, and/or on one or more other components of system 300. The radio proximity information may be sent to management server 321 to be used in determining, e.g., determining by the processing circuit in the management server 321, the relational device positioning of the radio devices RD 1-10 and/or of the hardware elements 304, 306, 308, 310, 312, 314, 316 in the rack 322, as will now be described below by method 400.

Figure 4:
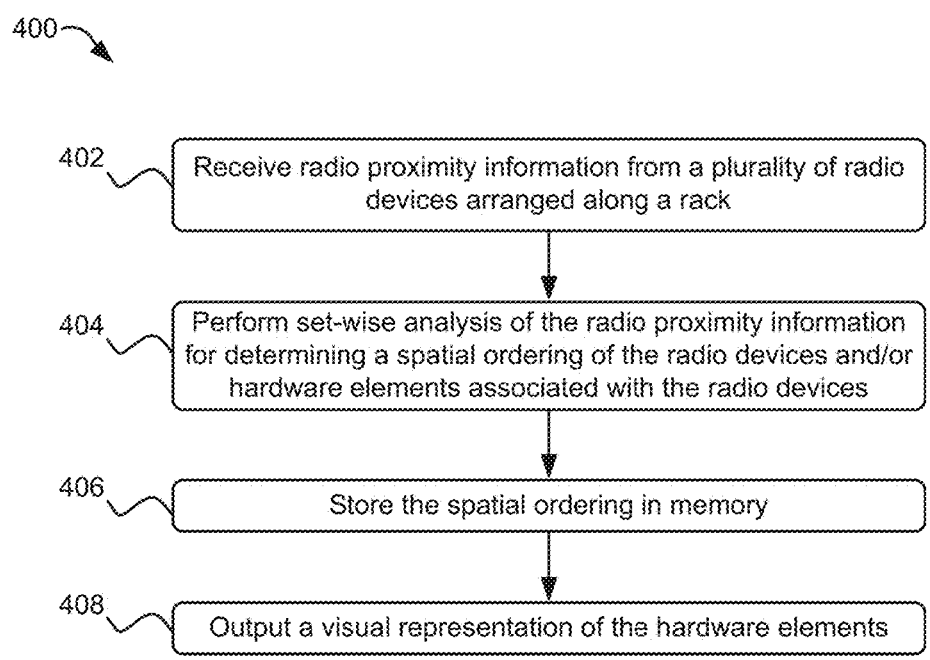
FIG. 4 is a flowchart of a method, in accordance with one embodiment.

FIG. 4 shows a method 400 that may be used by a management module for establishing relational device position determinations of radio devices and/or hardware elements associated with the radio devices, in accordance with one embodiment. As an option, the present method 400 may be implemented to systems such as those shown in the other FIGS. described herein. Of course, however, this method 400 and others presented herein may be used to provide applications which may or may not be related to the illustrative embodiments listed herein. Further, the methods presented herein may be carried out in any desired environment. Moreover, more or less operations than those shown in FIG. 4 may be included in method 400, according to various embodiments. It should also be noted that any of the aforementioned features may be used in any of the embodiments described in accordance with the various methods.

It should be noted that descriptions of the operations of method 400 herein are described herein, by way of example only, from the descriptive perspective of a management server.

Operation 402 of method 400 includes receiving radio proximity information from a plurality of radio devices arranged along a rack. The radio proximity information may be received as part of performing an inventory of hardware elements in the rack, for example.

According to one approach, the radio proximity information may be received by the management server wirelessly.

According to another approach, the radio proximity information may be received by the management server via a hardwired connection. The hardwired connection may include wiring that originates at each of the hardware elements and/or the radio devices.

The radio proximity information may include information that corresponds to a portion and/or all of the devices and/or hardware elements in the rack. For example, the radio proximity information in Table 1 includes radio proximity information that corresponds to the discovery of radio devices RD 1-4, while Table 2 includes different proximity information that corresponds to the discovery of radio devices RD 8-10.

It should be noted that a determination of the spatial ordering of the hardware elements of the rack may be made in response to the spatial ordering of the radio devices being determined and/or known.

Operation 404 of method 400 includes performing set-wise analysis of the radio proximity information for determining a spatial ordering of the radio devices and/or hardware elements associated with the radio devices. The spatial ordering of the radio devices may be determined and correlated to the hardware elements associated therewith, e.g., via a table setting forth the association.

Performing set-wise analysis of the radio proximity information may include using comparative matrix mathematics. According to one approach, performing comparative matrix mathematics on the radio proximity information may include performing a delta comparison on the radio proximity information to determine one or more locality relationships.

According to another approach, performing set-wise analysis of the radio proximity information may include a comparative process of known type that would be appreciated by one skilled in the art upon reading the present description.

The set-wise analysis of the radio proximity information may utilize the operational communication range of one or more of the radio devices to at least in part determine the spatial ordering.

For example, a set-wise analysis of the radio proximity information discovered in operational communication ranges 326-332 (see Table 1) using a delta comparison will now be described.

Using a delta comparison, because radio device RD 1 which is associated with hardware element 314 fails to discover radio device RD 4 which is associated with hardware element 308, and radio devices RD 2 and 3 which are associated with hardware elements 312, 310 both discover radio devices RD 1 and 4, which are associated with hardware elements 314, 308, it may be determined that hardware elements 312 and 310, are positioned between hardware element 314 and hardware element 308. Additionally, because the radio device RD 3 which is associated with hardware element 310 discovers one more radio device than radio device RD 2 does, it may also be determined that hardware element 310 is positioned one position further away from hardware element 314 than hardware element 312 is.

In response to the above analysis being performed by the management server, a user may be presented with the possible spatial ordering configurations of the radio devices and/or hardware elements associated with the radio devices. The possible spatial ordering of radio devices RD 1-4 in the present illustrative analysis may be determined to be: radio device RD 4, radio device RD 3, radio device RD 2, radio device RD 1 or radio device RD 1, radio device RD 2, radio device RD 3, radio device RD 4.

Accordingly, a possible spatial ordering of the corresponding hardware elements 308-314 in the present analysis may be determined to be: 308, 310, 312, 314 or 314, 312, 310, 308.

For purposes of another example, a set-wise analysis of the radio proximity information discovered in operational communication ranges 334-338 (see Table 2) may be performed using a delta comparison.

Using a delta comparison, because radio device RD 8 which is associated with hardware element 316, and has the operational communication range 334, discovers radio device RD 9 of hardware element 318, and because radio device RD 9, which has the operational communication range 336, discovers radio device RD 8, it may be determined that radio device RD 8 and radio device RD 9 are positioned next to one another.

Because the radio device RD 10 of the 4U hardware element 320 is not discovered by any neighboring radio devices, e.g., radio devices RD 8-9, a user may manually designate positional information of hardware element 320.

It may be noted that although FIGS. 3A-3B illustrate the radio devices RD 1-10 as being positioned at a center-point (in a direction W) of the left-side of the hardware elements 302-320, in different embodiments, any of the radio devices RD 1-10 may be placed in differing locations, e.g., to improve radio device discovery.

For example, radio device RD 10 which is associated with the 4U hardware element 320 may be discoverable by neighboring radio devices RD 8-9, if the radio devices RD 8-10 are positioned, e.g., at a lower edge of the hardware elements 316-320, at a lower center location of the hardware elements 316-320, in positions that allow each of the operational communication ranges 334-338 to overlap with a different of the operational communication ranges 334-338, etc., where the hardware elements adjacent the 4U hardware element 320 are at least 1U smaller than the 4U hardware element 320.

This advantage may also be extended to configurations where multiple endpoints reside side-by-side in a single U and/or in a set of Us in a chassis in a rack. Provided that the operational communication ranges of the discovered radio devices provide sufficient discovery data for the set-wise analysis, e.g., to eliminate ambiguity of the physical configuration, composed units of hardware elements may be placed into the rack by an administrator with a logical management perspective.

Referring again to the set-wise analysis of the radio proximity information of Table 1, it should be noted that the programmatic analysis using operation 404 may not be able to determine whether the hardware elements of the rack 322 are ordered 308, 310, 312, 314 (counted from high to low position in the rack 322) or 314, 312, 310, 308 (also counted from high to low position in the rack 322). Accordingly, the management server may be initially unable to establish a deterministic ordering of the two outermost hardware elements 308, 314 after performing a set-wise analysis.

In response to the management module performing method 400 being unable to determine a deterministic ordering of at least two of the radio devices, a request for disambiguating information may be output. The request may be output to, e.g., a user, hardware elements of the system in which method 400 is being performed, an output destination that contains deterministic information pertaining to the proximity of hardware elements included in the system in which method 400 is being performed, etc.

The request for disambiguating information may be output, e.g., to a device via an email, to a phone via a short message service (SMS) message, to a local graphical user interface (GUI) via a hard wire connection, etc.

In response to the request for disambiguating information being made, disambiguating information may be provided if available. According to one approach, the disambiguating information may be provided by a user that received the request for disambiguating information. According to another approach, the disambiguating information may be provided by a management server which has access to a reference table, e.g., where the reference table includes the known position of one or more radio device and/or hardware element associated with the radio device.

In another embodiment, a designation of one of the radio devices and/or hardware elements associated with the radio devices as an anchor may be received. The anchor may include a known position, e.g., which radio device and/or hardware element associated with the radio device is on the bottom or top of the rack.

For example, to establish a deterministic ordering of the two outermost hardware elements 308, 314, a user may be asked "Is hardware element 314 positioned lower or higher (where direction W points low to high) in the rack 322 than hardware element 308?" A user may then respond providing disambiguating information that hardware element 308 is located higher in the rack 322 than hardware element 314. This disambiguating information may establish hardware element 314 as an anchor in the array of hardware elements 314-308.

The spatial ordering of the radio devices and/or hardware elements associated with the radio devices may be stored in relation to the anchor.

A received anchor may also be stored, e.g., on the corresponding hardware element, in the system where method 400 is being performed, in a cloud based memory module, etc., for future reference.

According to one approach, disambiguating information may not be requested by a management module without an inability to determine the deterministic ordering of at least two of the radio devices. According to another approach, disambiguating information from such destinations may be requested for any reason, e.g., in order to double-check a determined ordering of at least two of the radio devices, in response to detecting an error during set-wise analysis, in response to a loss of spatial ordering determination(s), etc.

Operation 406 includes storing the spatial ordering in memory. The stored spatial ordering may include a spatial ordering of the radio devices and/or a spatial ordering of the hardware elements associated with the radio devices. The spatial ordering may be stored in memory at one or more locations. For example, the spatial ordering may be stored, e.g., in memory on a hardware element, in a cloud memory, by a user that is presented with the spatial ordering (see operation 408), etc.

Storing the spatial ordering in memory may provide a data system with a reference of the hardware elements that are included in the system when insertion/removal device recording instrumentation and/or manual input of placement data is not available. The stored spatial ordering may also be referenced in subsequent spatial ordering determinations.

Optional operation 408 includes outputting a visual representation of the hardware elements. For example, the visual representation of the hardware elements in the rack corresponding to the spatial ordering may be output to, e.g., a list, a table, a graphic, etc. The output spatial ordering may be stored at such a destination, and may provide a reference, e.g., for a user managing the server rack, to be used as a reference by a user attempting to provide disambiguating information to a management server, for reference of a type that would be appreciated by one skilled in the art upon reading the present description.

The spatial ordering may also be output for presentation to a user via any suitable mechanism. In one approach, the spatial ordering may be output to a GUI. In another approach, the spatial ordering may be output to the addressed parties of an email. In yet another approach, the spatial ordering may be output to a user in a SMS.

Method 400 may be re-initiated in response to an event occurring.

For example, according to one approach, method 400 may be re-initiated in response to a user request.

According to another approach, method 400 may be re-initiated in response to the management server 321 receiving notification of a hardware change in the rack 322. A hardware change in the rack 322 may include one or more hardware elements being added to the rack 322. A hardware change in the rack 322 may also include one or more hardware elements being removed from the rack 322.

Method 400 may also and/or alternatively be repeated in response to detecting radio proximity information from a new radio device. For example, the radio devices may constantly and/or periodically search for a new radio device, e.g., after method 400 has been performed.

According to another embodiment, method 400 may be repeated in response to detecting loss of radio proximity information from one of the radio devices. For example, the radio devices may constantly and/or periodically search for the loss of detection of a previously detected radio device, e.g., after method 400 has been performed.

In one approach, after repeating method 400, it may be determined that that no radio devices detect a signal from the one of the radio devices, e.g., one or more radio devices that were previously detected by other radio devices but are currently not detected. It may also be determined that the one of the radio devices has been removed from the rack and/or powered off in response to failure to detect a signal therefrom.

In another approach, after repeating method 400, it may be determined that at least another radio device detects a signal from the one of the radio devices, e.g., one or more radio devices that were previously detected by other radio devices but are currently not detected. In response to such a determination, it may be determined that that the one of the radio devices remains present in the rack, e.g., it has a weak signal.

The radio device having a weak signal may result from the radio device being positioned in or adjacent a hardware element, where the hardware element is positioned in a rack whose structure unintentionally blocks incoming and/or outgoing signals of the radio device. To correct and/or prevent such radio device from having weak signals, the location of radio device on a hardware element may be adjusted.

According to another embodiment, a radio device having a weak signal may result from the radio device being damaged and/or non-functional. In response to determining that the radio device is damaged and/or non-functional, the radio device may be easily and inexpensively replaced or repaired.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
receiving radio proximity information from a plurality of radio devices arranged along a rack,
wherein, for each of at least some of the radio devices, the radio proximity information from the radio device includes discovery by the radio device of at least three other radio devices arranged vertically with the radio device along the rack within known range of the radio device, each of the radio devices being associated with a corresponding hardware element, each hardware element being associated with only a single one of the radio devices;
performing set-wise analysis of the radio proximity information for determining a spatial ordering of the radio devices and/or the hardware elements associated with the radio devices;
outputting the spatial ordering for presentation;
detecting loss of radio proximity information from one of the radio devices, and repeating the receiving and performing in response thereto; and
determining that no radio devices detect a signal from the one of the radio devices, and increasing a known range of at least one of the radio devices in response thereto.

2. The method of claim 1, wherein performing the set-wise analysis includes using comparative matrix mathematics.

3. The method of claim 1, wherein the set-wise analysis utilizes the known range to at least in part determine the spatial ordering, wherein the known range of at least one of the radio devices is scaled to extend to at least three other radio devices arranged vertically therewith along the rack.

4. The method of claim 1, further comprising: performing an inventory of hardware elements in the rack, and correlating the spatial ordering with the hardware elements.

5. The method of claim 1, further comprising: determining that at least another radio device detects a signal from the one of the radio devices, and determining that the one of the radio devices remains present in the rack in a same position relative to the other radio devices.

6. The method of claim 5, further comprising:
storing the spatial ordering in memory.

7. The method of claim 1, further comprising: in response to an inability to determine a deterministic ordering of at least two of the radio devices and/or hardware elements associated with the radio devices, outputting a request for disambiguating information.

8. The method of claim 1, further comprising: receiving designation of one of the radio devices and/or hardware elements associated with the radio devices as an anchor, wherein the spatial ordering of the radio devices and/or hardware elements associated with the radio devices is stored in relation to the anchor.

9. The method of claim 1, further comprising: detecting radio proximity information from a new radio device, and repeating the receiving, performing and outputting in response thereto.

10. A computer program product comprising a non-transitory computer readable storage medium having program code stored thereon, the program code executable by a computer to cause the computer to perform a process comprising:
receiving radio proximity information from a plurality of radio devices arranged along a rack,
wherein, for each of at least some of the radio devices, the radio proximity information from the radio device includes discovery by the radio device of at least three other radio devices arranged vertically with the radio device along the rack within known range of the radio device, each of the radio devices being associated with a corresponding hardware element, each hardware element being associated with only a single one of the radio devices;

performing set-wise analysis of the radio proximity information for determining a spatial ordering of the radio devices and/or the hardware elements associated with the radio devices;

outputting the spatial ordering for presentation;

detecting loss of radio proximity information from one of the radio devices, and repeating the receiving, performing and outputting in response thereto; and determining that no radio devices detect a signal from the one of the radio devices, and increasing a known range of at least one of the radio devices in response thereto.

11. The computer program product of claim 10, wherein performing the set-wise analysis includes performing comparative matrix mathematics, wherein performing comparative matrix mathematics includes performing a delta comparison.

12. The computer program product of claim 10, wherein the set-wise analysis utilizes the known range to at least in part determine the spatial ordering.

13. The computer program product of claim 10, further comprising: performing an inventory of hardware elements in the rack, and correlating the spatial ordering with the hardware elements.

14. The computer program product of claim 13, further comprising: storing the spatial ordering in memory.

15. The computer program product of claim 10, further comprising: in response to an inability to determine a deterministic ordering of at least two of the radio devices and/or hardware elements associated with the radio devices, outputting a request for disambiguating information.

16. The computer program product of claim 10, further comprising: receiving designation of one of the radio devices and/or hardware elements associated with the radio devices as an anchor, wherein the spatial ordering of the radio devices and/or hardware elements associated with the radio devices is stored in relation to the anchor.

17. A system, comprising:

a processing circuit having logic stored thereon and/or in memory, the logic being configured to:

receive radio proximity information from a plurality of radio devices arranged along a rack, wherein, for each of at least some of the radio devices, the radio proximity information from the radio device includes discovery by the radio device of at least three other radio devices arranged vertically with the radio device along the rack within known range of the radio device, each of the radio devices being associated with a corresponding hardware element, each hardware element being associated with only a single one of the radio devices;

perform set-wise analysis of the radio proximity information for determining a spatial ordering of the radio devices and/or hardware elements associated with the radio devices;

output the spatial ordering for presentation;

repeat the receiving, performing, and outputting, in response to detecting loss of radio proximity information from one of the radio devices; and increase a known range of at least one of the radio devices in response to determining that no radio devices detect a signal from the one of the radio devices.

18. The system of claim 17, further comprising: the rack, and hardware elements installed in the rack, the radio devices being coupled to the hardware elements, the radio devices being in communication with the processing circuit, wherein the set-wise analysis is performed for each vertical column of hardware elements in the rack.

* * * * *